Figure 1:
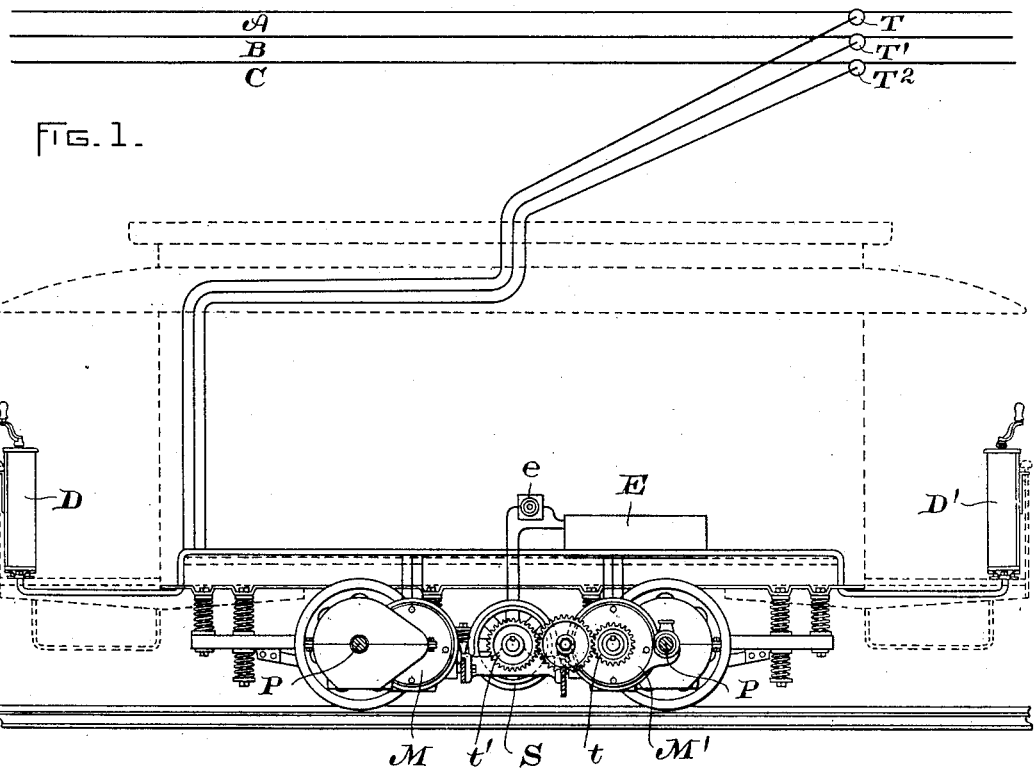

(No Model.) 2 Sheets—Sheet 1.

E. W. RICE, Jr.
BRAKING ALTERNATING CURRENT INDUCTION MOTORS.

No. 595,413. Patented Dec. 14, 1897.

WITNESSES.
A. H. Abell.
A. F. Macdonald.

INVENTOR.
Edwin W. Rice Jr.
by Geo. R. Blodgett
Atty.

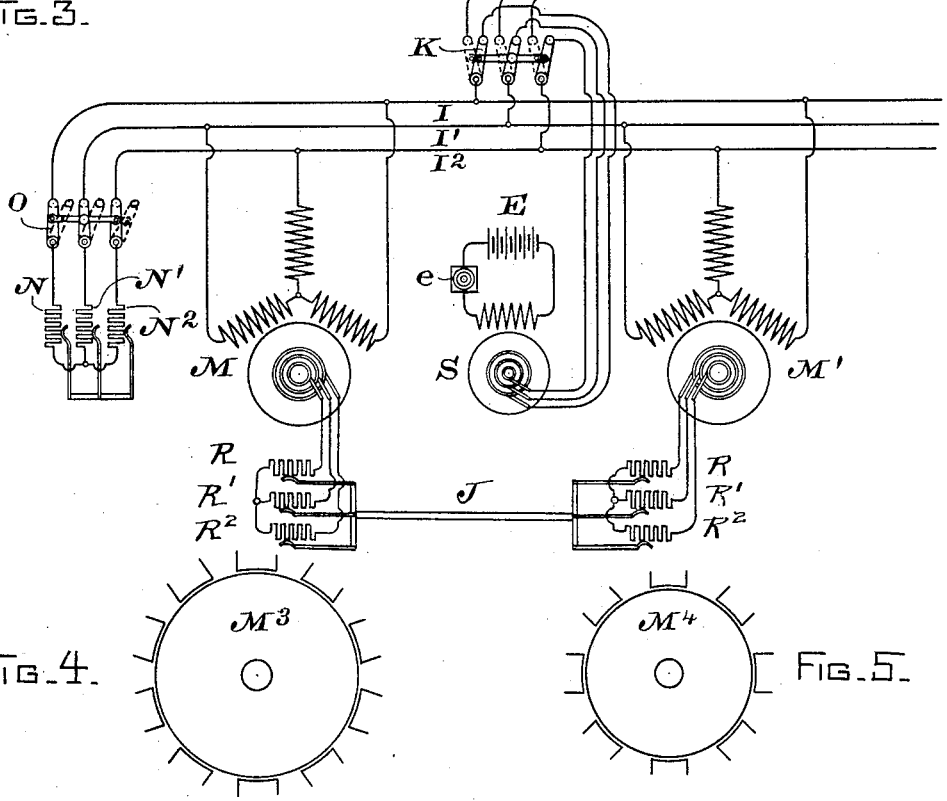

UNITED STATES PATENT OFFICE.

EDWIN W. RICE, JR., OF SCHENECTADY, NEW YORK, ASSIGNOR TO THE GENERAL ELECTRIC COMPANY, OF NEW YORK.

BRAKING ALTERNATING-CURRENT INDUCTION-MOTORS.

SPECIFICATION forming part of Letters Patent No. 595,413, dated December 14, 1897.

Application filed March 6, 1897. Serial No. 626,287. (No model.)

*To all whom it may concern:*

Be it known that I, EDWIN W. RICE, Jr., a citizen of the United States, residing at Schenectady, county of Schenectady, State of New York, have invented certain new and useful Improvements in Braking Alternating-Current Induction-Motors, (Case No. 538,) of which the following is a specification.

My present invention comprises certain means for braking an electric car or other mechanism which is normally driven by one or more alternating-current induction-motors.

In continuous-current systems of electric traction the cars are now often braked by cutting off the power-circuit from the motors, reversing the motors, and connecting them in a closed local circuit in which the motors are driven as generators, sending current through a resistance or through a resistance and brake-magnet, as engineers who have followed the art will understand without further explanation.

Efforts are now being made to adapt alternating-current induction-motors to electric traction service, and one of the objections sometimes raised is that these motors cannot be used for braking the cars, as can direct-current motors in a continuous-current system. I aim to avoid this objection and to provide means whereby the cars can be braked by driving the induction-machines as generators from the car-axles. To accomplish this, a switch or controller is provided for cutting off the power-circuit from the motor or motors and for connecting them in a local circuit, so that the induction-machines, no longer receiving power from the line, will be driven from the car-axles. In order that the induction-machines may work properly as generators, I also connect to the local circuit what I term a "phase-setter," consisting ordinarily (though not in all cases necessarily) of a synchronous machine driven by the car and having a continuous-current field-excitation.

Alternating-current induction-motors will work as generators when driven above synchronism and when the proper phase relation is maintained in the circuit connecting the phase-setter and motors. For example, if an induction-motor be coupled to an ordinary alternating generator of given frequency and the current in the connecting-circuit is leading and the induction-motor be driven at a speed above synchronism it will act as a generator and deliver energy to the circuit instead of absorbing it therefrom. Accordingly in my braking system the synchronous and induction machines will be so designed or geared that the induction-machine will be driven above synchronism at all times, no matter what the speed of the car may be. The synchronous machine of course will set the phases of the circuit, and the induction-machine will be driven above synchronism either when driven at the same speed as the synchronous machine, but given a larger number of poles, or if the synchronous and induction machines have the same number of poles and the gearing be such that the induction-machine travels faster. The synchronous machine, since it simply furnishes magnetizing-current, need have no great power, but will ordinarily be designed to give a voltage considerably higher than that on the power-circuit, so that the induction-machines when driven as generators may consume a large amount of energy quickly.

Figure 2:
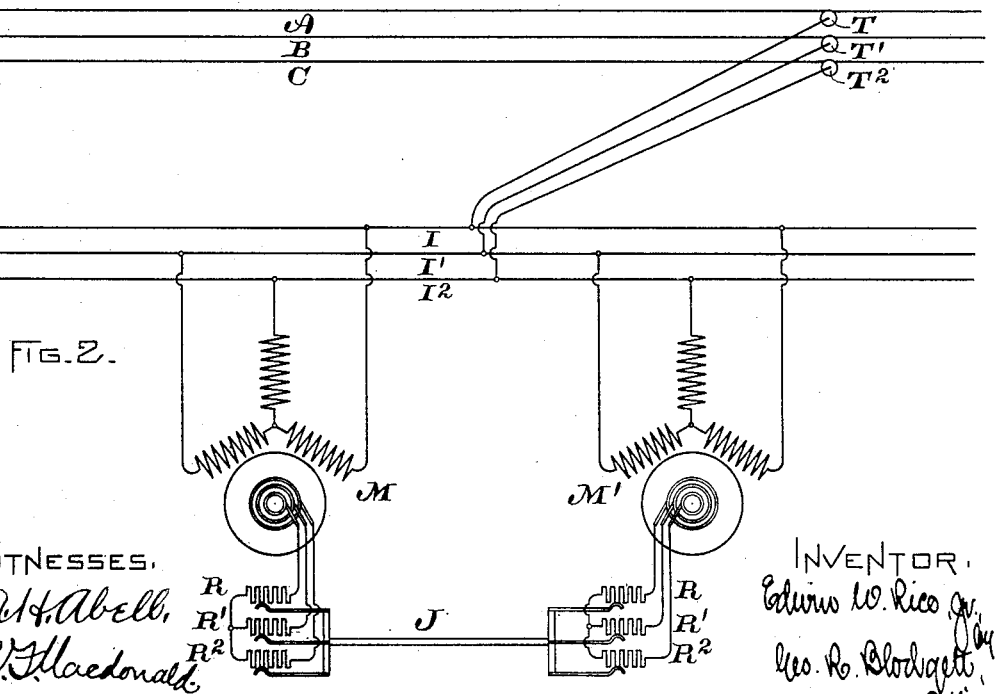

In the accompanying drawings, Figure 1 illustrates a car with its electrical equipment. Figs. 2 and 3 are diagrams of circuits. Figs. 4 and 5 illustrate certain features of the induction and synchronous machines, and Fig. 6 is a detail view.

In the drawings a three-phase alternating system is shown, though, as engineers will readily understand, alternating-current motors of any other number of phases may be operated in a similar manner. In Fig. 1 the mains of the three-phase system are represented at A B C, from which current is carried to the car by trolleys or collectors T T' T² of any desired description. Controllers D D' are mounted at opposite ends of the car and will be constructed so as to make the necessary circuit changes described hereinafter. Engineers will readily understand how to design the controllers, and I do not attempt herein to do more than to indicate the circuit changes which should be made. Alternating-current induction-motors are mounted on the truck and geared to the axles. I also mount on the car or truck a synchronous machine S, which may resemble in construction ordinary synchronous generators having a field-winding excited from any convenient source of continuous current. A battery E is shown for this purpose having in its circuit a regulating-rheostat $e$.

The particular manner in which the synchronous machine is mounted and geared is unessential, though positive gearing is preferable. Fig. 6 is a detail view showing this part of the construction more clearly. In this figure P is one of the car-axles to which one of the induction-motors M is geared by a pinion and gear-wheel. I prefer, though it is not essential, to connect the armature-shaft of the synchronous machine to the gear-wheel $t'$ by a clutch $t^2$ or to employ some equivalent arrangement. The object is to allow the synchronous machine to remain at rest at all times except when it is required to furnish an exciting-current. In this arrangement the induction and synchronous machines may be given the same number of poles and the synchronous machine geared so as to run slower than the induction-machine, as is indicated by the relative diameters of gear-wheels $t\ t'$.

In Fig. 2 the mains A B C and trolleys T T' T² are represented as before. The trolleys are connected with cables I I' I², and two induction-motors M M' have their primary coils connected to the cables, while the secondaries of the motors are closed through resistances R R' R² in any ordinary manner. I have shown a switch J for varying the resistances in the secondary circuits of both motors simultaneously. In this diagram the motors are shown coupled to the power-circuit for normally propelling the car. Of course in practice it is not at all essential that the different motors (in an equipment where a number of motors are used) be always coupled in multiple. They may be coupled in tandem or preferably for speed regulation be coupled at times in tandem and at other times in multiple by what is now known in the art as "tandem-multiple" regulation.

In Fig. 3 the mains and trolleys are represented as before, but the trolley-circuit is cut off from the induction-machine by the switch K. The synchronous machine S, also a three-phase machine, is connected with the cables I I' I², and resistances N N' N², preferably non-inductive, have also been brought into circuit by the switch O, so that the induction-machines M M' are coupled in a local circuit with the resistances and the synchronous machine. The motors and synchronous machine are now all driven from the axles and the synchronous machine acts as a phase-setter for the induction-machine, so that the latter will generate current and expend energy in the local circuit through the resistance.

As already pointed out, it is necessary that the induction-machine for braking purposes be driven above synchronous speed as fixed by the phase-setting machine. This result may be secured either by properly adjusting the relative speeds of the synchronous and induction machine or by varying the number of poles which the different machines have, or by both methods. As shown in Figs. 1 and 6, the gearing is such that the synchronous machine is driven at a slower rate of speed than the induction-machines, and therefore the induction-machine will rotate above synchronism, though both types of machine have the same number of poles. In other cases where it is more convenient to have all the machines driven at the same speed I will use induction-machines of a certain number of poles and a synchronous machine of a smaller number of poles. This is indicated in Figs. 4 and 5, where there are shown an induction-machine M³, having ten poles, and a synchronous machine M⁴, having eight poles. Of course this ratio may be widely varied in different installations to suit the requirements in each case. The synchronous machine will ordinarily be built of a voltage sufficiently greater than the line-voltage to enable the induction-machines to consume the energy necessary for promptly braking the car; but the synchronous machine need not be a large one, since its function is primarily to supply magnetizing-current to the induction machine or machines.

What I claim as new, and desire to secure by Letters Patent of the United States, is—

1. The method of braking the load connected to an induction-motor, which consists in connecting the motor with a circuit capable of absorbing energy, and passing through its inducing member an alternating magnetizing-current, of a frequency such that the motor will act as an induction-generator.

2. The combination of one or more induction-machines normally supplied with power and working as motors, with a phase-setter and means for cutting off the power-circuit and connecting a circuit capable of absorbing energy and the phase-setter to the terminals of the induction-machine, whereby the induction-machine will be driven as a generator, and brake the mechanism to which it is connected, as described.

3. The combination of one or more induction-motors for propelling a car or vehicle, with a phase-setting machine and means for cutting off the power-supply, and connecting a circuit capable of absorbing energy, and the phase-setting machine, to the primaries of said motor, the whole being so arranged that the induction-motor will be driven above synchronism and act as a generator, for the purpose set forth.

4. The combination of one or more induction-motors, a driven mechanism, a synchronous machine, means for cutting off the power-supply and connecting the induction and synchronous machines in a local circuit, for braking purposes, as set forth.

5. The combination in an electric traction system, of a car, a multiphase induction-motor for normally driving the car, a synchronous machine carried on the car, means for cutting off the power-circuit from the induction-machine, and for connecting the synchronous machine, the induction-machine and a non-inductive resistance in multiple in a closed local circuit, the whole being so arranged that upon braking the car the synchronous and induction machines are both driven by the car-axles, and the induction-machine driven above synchronism, for the purpose set forth.

6. The combination in an electric traction system of an induction-motor for propelling the car, a synchronous machine of comparatively small power but of high voltage relatively to the voltage of the power-circuit, means for cutting off the power-circuit, and for coupling the synchronous and induction machines in a closed local circuit, the synchronous and induction machines being so designed and arranged that the induction-machine is driven above synchronism as a generator delivering energy to the local circuit, as set forth.

7. The combination in an electric traction system of means for braking an electrically-driven car comprising an alternating-current motor geared to the axle of the car, and having its primary winding closed through a non-inductive resistance, and means for causing the motor to act as an induction-generator driven above synchronism.

8. The combination in an alternating-current traction system of an alternating-current induction-motor, having its primary winding connected in a local circuit with a phase-setting machine and with a non-inductive resistance, the said motor being so arranged as to be driven by the car above synchronism, as set forth.

In witness whereof I have hereunto set my hand this 25th day of February, 1897.

EDWIN W. RICE, JR.

Witnesses:
B. B. HULL,
C. L. HAYNES.